(12) United States Patent
Schmitt et al.

(10) Patent No.: US 8,340,402 B2
(45) Date of Patent: Dec. 25, 2012

(54) DEVICE AND METHOD FOR DETECTING A PLANT

(75) Inventors: Peter Schmitt, Erlangen (DE); Franz Uhrmann, Erlangen (DE); Oliver Scholz, Moehrendorf (DE); Guenther Kostka, Erlangen (DE); Ralf Goldstein, Erlangen (DE); Lars Seifert, Neumarket (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 299 days.

(21) Appl. No.: 12/794,389

(22) Filed: Jun. 4, 2010

(65) Prior Publication Data

US 2010/0322477 A1    Dec. 23, 2010

Related U.S. Application Data

(60) Provisional application No. 61/184,560, filed on Jun. 5, 2009.

(30) Foreign Application Priority Data

Jun. 4, 2009   (DE) .................... 10 2009 023 896

(51) Int. Cl.
   *G06K 9/00*    (2006.01)
(52) U.S. Cl. ..................................... 382/154
(58) Field of Classification Search ............... 382/106, 382/154; 348/42–60
   See application file for complete search history.

(56) References Cited

U.S. PATENT DOCUMENTS 5,130,545 A * 7/1992 Lussier ................. 250/458.1
5,253,302 A * 10/1993 Massen ................... 382/110
5,509,090 A * 4/1996 Maruyama et al. ........ 382/276
5,841,883 A * 11/1998 Kono et al. ............... 382/110

OTHER PUBLICATIONS

International Search Report, Application No. PCT/EP2010/057449, mailed Sep. 2, 2010.
Bourbakis et al., *Fusing Laser and Image Data for 3D Perceived Space Representations*, 1997, IEEE, pp. 50-58.
Huhle et al., *Integrating 3D Time-Of-Flight Camera Data and High Resolution Images for 3DTV Applications*, IEEE, 2007, pp. 1-4.
Song et al., *Surface Modelling of Plants from Stereo Images*, IEEE, 2007, pp. 312-319.
Lee et al., *Robotic Weed Control System for Tomatoes*, Precision Agriculture, 1999, pp. 95-113.
German Office Action, Application No. 102009023896.4-54, mailed Mar. 19, 2010.
Schenk et al., *Fusing Imagery and 3D Point Clouds for Reconstructing Visible Surfaces of Urban Scenes*, IEEE, 2007.

(Continued)

Primary Examiner — Alex Liew
(74) Attorney, Agent, or Firm — Patterson Thuente Christensen Pedersen, P.A.

(57) ABSTRACT

A device for detecting a plant includes a two-dimensional camera for detecting a two-dimensional image of a plant leaf having a high two-dimensional resolution, and a three-dimensional camera for detecting a three-dimensional image of the plant leaf having a high three-dimensional resolution. The two-dimensional camera is a conventional high-resolution color camera, for example, and the three-dimensional camera is a TOF camera, for example. A processor for merging the two-dimensional image and the three-dimensional image creates a three-dimensional result representation having a higher resolution than the three-dimensional image of the 3D camera, which may include, among other things, the border of a leaf. The three-dimensional result representation serves to characterize a plant leaf, such as to calculate the surface area of the leaf, the alignment of the leaf, or serves to identify the leaf.

19 Claims, 7 Drawing Sheets

OTHER PUBLICATIONS

"Notification of Transmittal of Copies of Translation of the International Preliminary report of Patentability" for International Application No. PCT/EP2010/057449 filed May 28, 2010; 6 pages.

"Image-based Plant Modeling", Quan et al., The Hong Kong University of Science and Technology, *Microsoft Research, © 2006 ACM 0730-0301/06/0700-0599, pp. 599-604.

* cited by examiner

DEVICE AND METHOD FOR DETECTING A PLANT

RELATED APPLICATIONS

The present application claims the benefit of U.S. Provisional Application No. 61/184,560 filed Jun. 5, 2009, which is incorporated herein in its entirety by reference and claims priority to German Application No. 102009023896.4 filed Jun. 4, 2009, which is incorporated herein in its entirety by reference.

TECHNICAL FIELD

The present invention relates to plant detection, and in particular to optical detection of plants which are planted on a field or in a greenhouse.

BACKGROUND

Detection of plants is important in agricultural technology, in which context mention shall be made of so-called phenotyping of plants. A further example of detection is identification of plants so as to enable, for example, automatic weeding, or removal of undesired plants, i.e. weeds.

Various methods are commonly used for three-dimensional detection of objects, such as stripe light methods or light section methods. Said methods offer high spatial three-dimensional resolution. However, with regard to illumination, they are dependent on defined ambient conditions. A further disadvantage is that three-dimensional detection cannot be performed within a very short time.

With stripe light methods, various light patterns need to be projected onto the object successively, whereas light section methods comprise detecting only one contour line at any given point in time. Thus, for three-dimensional detection, the object has to be scanned.

For generating the defined light conditions on a field, one may set up a tent which keeps the ambient light from the area to be detected. Then a defined ambient condition may be created within said light-proof tent so as to apply the light section method or the stripe light method. Once a specific area located within the tent is done with, the tent has to be taken down and set up again at another location, whereupon the light section method or the stripe light method may be applied again at said other location.

This approach is time-consuming and therefore expensive. Also, it is not suitable for three-dimensional detection of relatively large areas, since this procedure is too slow. To achieve sufficient throughput, a very large number of light section teams would have to work in parallel, which necessitates a large number of tents, a large number of light section cameras and, therefore, a large demand for qualified skilled labor, all of which leads to an increase in cost.

On the other hand, it is very important, in particular for developing plant seeds, to obtain, at regular intervals, such as every week to every other week, an objective assessment of the seedlings produced from one type of seeds without said seedlings being destroyed. It shall be noted that in this context, such fields may be used as test fields which have a minimum size so as to have reasonably realistic growth conditions. Therefore, if one intends to have large cultivation areas for one type of seeds, relatively large test areas will be necessitated.

What is necessitated in addition to test areas of significant sizes is precise data on the spatial alignment of plant leaves, on the size of the plant leaves, on the structure of the plant leaves, etc., in order to obtain accurate information about a specific type of seeds. To reliably obtain said information when the plants may not be torn out, three-dimensional detection is necessitated, since with two-dimensional detection, only projections or silhouettes of leaves are detected, but their alignment cannot be determined, and their true surface area also cannot be determined because one cannot deduce the surface area itself from a projection without having any knowledge of the alignment of the projected area.

SUMMARY

According to an embodiment, a device for detecting a plant may have: a means for providing at least one two-dimensional image of a plant leaf with a first two-dimensional resolution, and for providing at least one three-dimensional image of the plant leaf, the three-dimensional image comprising a two-dimensional representation of the plant leaf with a second two-dimensional resolution which is smaller than the first two-dimensional resolution, and comprising a third dimension of the three-dimensional image for points of the two-dimensional representation; and a processor for merging the two-dimensional image and the three-dimensional image so as to obtain a three-dimensional result representation of at least a portion of the plant leaf, said result representation comprising three-dimensional information for a number of points which is larger than the number of points of the portion of the three-dimensional image for which the information about the third dimension exists, to transform the three-dimensional image to a surface representation, to transform the two-dimensional image to a multi-valued three-dimensional representation wherein a third dimension is multi-valued and is restricted to having points on a beam starting from a projection center, and to determine an unambiguous third dimension by calculating an intersection point of the beam with the surface representation.

According to another embodiment, a method of detecting a plant may have the steps of: providing a two-dimensional image of a plant leaf with a first two-dimensional resolution, and providing a three-dimensional image of the plant leaf, the three-dimensional image comprising a two-dimensional representation of the plant leaf with a second two-dimensional resolution which is smaller than the first two-dimensional resolution, and comprising a third dimension of the three-dimensional image for points of the two-dimensional representation; and merging the two-dimensional image and the three-dimensional image so as to obtain a three-dimensional result representation of at least a portion of the plant leaf, said result representation comprising three-dimensional information for a number of points which is larger than the number of points of the portion of the three-dimensional image for which the information about the third dimension exists, to transform the three-dimensional image to a surface representation, to transform the two-dimensional image to a multi-valued three-dimensional representation wherein a third dimension is multi-valued and is restricted to having points on a beam starting from a projection center, and to determine an unambiguous third dimension by calculating an intersection point of the beam with the surface representation.

Another embodiment may have a computer program having a program code for performing the inventive method of detecting a plant, when the computer program runs on a computer.

The present invention is based on the finding that precise three-dimensional detection of a plant can be achieved fast, and, therefore, efficiently and, as far as possible, without any additional expenditure, such as defined light conditions, for example, if highly sophisticated, high-resolution two-dimensional detection by means of, e.g., a digital camera is used, but that additionally, coarsely resolved three-dimensional images are generated which may be obtained in a fast and efficient manner because only a low resolution is necessitated.

These three-dimensional images need only have a low resolution, which means that the number of points, or dots, in the three-dimensional image, for which there is information about the third dimension, which may be, e.g., the distance of the point from the camera objective, is relatively small.

However, this coarsely resolved three-dimensional representation may be detected considerably faster than a finely resolved three-dimensional representation.

Coarse three-dimensional detection is employed without any defined ambient light conditions. TOF (time of flight) cameras are particularly suitable for this purpose since they are able to capture, or take, coarsely resolved three-dimensional pictures under normal ambient conditions and at high speed.

A processor is provided for merging the two-dimensional image and the three-dimensional image so as to obtain a three-dimensional result representation having a higher resolution than the three-dimensional image of the three-dimensional camera, the additional points comprising three-dimensional information having been determined by using the highly resolved two-dimensional image.

Various algorithms may be used for merging the two-dimensional data and the three-dimensional data, such as algorithms which are based on a three-dimensional coarse reconstruction and which refine the coarsely resolved three-dimensional reconstruction by using the highly resolved two-dimensional representation.

Other algorithms which are based on previous knowledge about the plants to be detected employ the highly resolved two-dimensional representation so as to extract a parameterized three-dimensional representation, which corresponds to the two-dimensionally captured object, from a model database, in which case one or several parameters of the parameterized three-dimensional representation from the model database are calculated for the actually captured plant or plant leaf, for example by means of numeric methods, using the coarsely resolved three-dimensional representation and possibly using the highly resolved two-dimensional representation.

Yet other algorithms are based on that an interpolation between three-dimensionally measured nodes is performed on the basis of a comparison of a projection of the three-dimensional interpolation with the two-dimensionally captured silhouette, or on the basis of an ambiguous three-dimensional reconstruction of the two-dimensionally captured silhouette so as to obtain, in one step or by means of an iterative method, the interpolation between the coarsely captured three-dimensional interfaces in order to obtain an improved three-dimensional representation.

The present invention is advantageous in that the necessitates placed upon three-dimensional capturing are small, which enables utilizing fast detection concepts, and, also detection concepts necessitating no defined ambient conditions in order to perform three-dimensional detection.

On the other hand, two-dimensional highly resolved detection, which is color detection, is highly advanced, up to the extent that extremely fast, extremely sharp and extremely highly resolved low-noise images may already be captured using commercial digital cameras available at low cost.

Thus, the present invention enables fast, but nevertheless sufficiently accurate capturing of plants, which may simply be achieved in that both detection cameras are mounted on a tractor, for example. The tractor travels across a field at a continuous speed, it being quite possible for said speed, due to the fast functionality of the highly resolved two-dimensional camera and of the low-resolution three-dimensional camera, to be higher than 3 km/h. By means of a high repetition rate of the single frame detection, one may even achieve that each plant leaf or each plant can be seen on several single frames, so that an improved three-dimensional result representation of a plant leaf is achieved as compared to the case where only one single three-dimensional representation and one single two-dimensional representation from one single perspective in each case exists for a plant leaf.

It shall be noted that more than one two-dimensional camera or more than one three-dimensional camera may also be employed. In this manner, a quantity of images of the plant are obtained already at one position of the camera system, each image of the quantity representing a plant from a different angle or from a different perspective. Therefore, the result is analogous to the result obtained when pictures of a plant are captured from several perspectives which result from the camera system having moved between each capturing operation. By analogy, systems which both comprise several cameras and move may also be employed.

A further advantage of fast detection is that the exposure times of the cameras are so short that even medium-range movements of the plants due to wind are uncritical. Even camera vibrations or alterations of the heights of the cameras with regard to the leaves are uncritical. However, the two cameras are attached to each other such that they will undergo the same vibrations and/or alterations in height and will capture them in a reasonably synchronized manner, even though movements such as vibrations take place at such a slow pace as compared to the exposure time that even non-synchronized exposure of the two cameras will lead, if anything, to a negligible error.

In accordance with the invention, large fields may therefore be measured fast and at relatively low expenditure. Therefore, the present invention enables low-cost detection of plants, which in particular is also suitable for being performed at short time intervals, since neither the plant seedlings (i.e. the small and sensitive young plant shoots shortly after germination) or young plants are destroyed by this, nor particularly high cost or a large amount of time are necessitated for detecting even a field comprising a considerable area.

BRIEF DESCRIPTION OF THE DRAWINGS

Embodiments of the present invention will be detailed subsequently referring to the appended drawings, in which.

DETAILED DESCRIPTION

Figure 1:
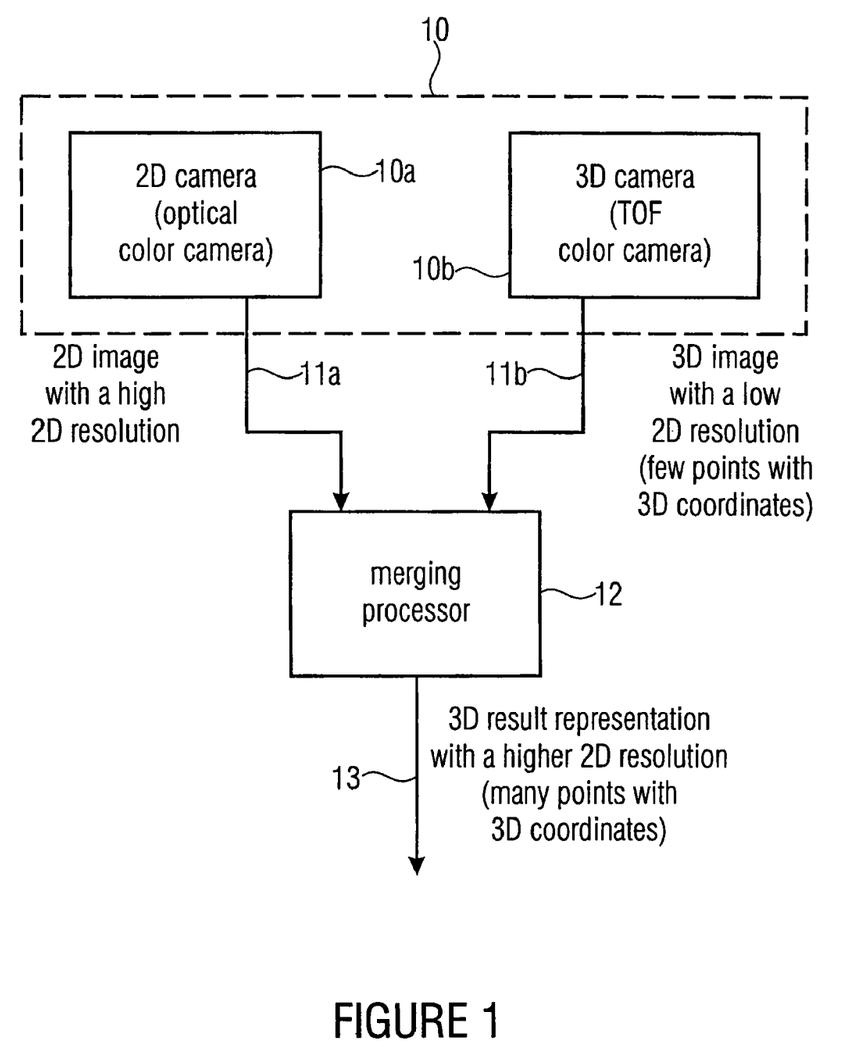
FIG. 1 is a block diagram of an implementation of the device for detecting a plant.

FIG. 1 shows a device for detecting a plant in a schematic block diagram representation. The device comprises a means 10 for providing at least one two-dimensional image of a plant leaf having a first two-dimensional resolution. The means 10 is further implemented to also provide at least one three-dimensional image of the plant leaf, the three-dimensional image having a two-dimensional representation of the plant leaf with a second two-dimensional resolution which is smaller than the first two-dimensional resolution, and information being present for points of the two-dimensional representation, said information representing a third dimension of the three-dimensional image.

The means 10 comprises a 2D camera 10a for detecting the two-dimensional image having a high two-dimensional resolution on a line 11a. The means 10 for providing further comprises a 3D camera 10b for detecting the three-dimensional image of the plant leaf and for outputting said image on a line 11b.

The two-dimensional camera 10a is an optical color camera, for example a commercially available digital camera, whereas the three-dimensional camera is a TOF camera. Such TOF cameras have become available by now. Said TOF cameras provide information on the height of the object of measurement within a short time, the light-travel time, which differs in dependence on the distance from the camera, of an additional illumination means, typically in near infrared, being utilized for determining the distance. Such TOF cameras exhibit low pixel resolution and, above all, low distance resolution in the range of typically several millimeters to centimeters. Therefore, only a coarse image of the height of the object of measurement is generated in the line of vision of said TOF cameras.

The center for sensor systems (ZESS, Zentrum für Sensorsysteme) of the University of Siegen, Germany, has created a 2D/3D multi-camera which is based on monocular combination of a PMD sensor in accordance with the time of flight distance measurement principle and a conventional two-dimensional CMOS sensor. The distance sensor uses a modulated infrared coaxial light source which is integrated into the camera. The emitted light is reflected by the scene and is then detected by the PMD matrix, the incident light being correlated with a reference signal. In addition, the intensity sensor operates with the visible spectrum (daylight). Simultaneous detection of both images is achieved by the monocular design of the camera with a beam splitter. The monocular design mechanically guarantees simple image alignment. A data sheet on this camera is available via www.cess.uni-siegen.de.

The inventive device further comprises a processor 12 for merging the two-dimensional image on line 11a and the three-dimensional image 11b so as to obtain a three-dimensional result representation on an output line 13, which has a higher two-dimensional resolution than the three-dimensional image detected by the 3D camera 10b. This three-dimensional result representation of the plant leaf comprises three-dimensional information for a number of points, said number being larger than the number of points of the three-dimensional image (of line 11b) for which the data of the third dimension has been detected by the camera 10b. Said data of the third dimension is, for example, data on the distance from a two-dimensional point in the 3D image to a lens of the 3D camera.

The processor may be a general-purpose CPU of a personal computer, or a specifically adapted graphics processor which is adapted particularly for the image processing routines necessitated. The processor comprises an ALU, a register and one or several data busses and may further be coupled to an external memory, to input and/or output devices and, e.g., to a communication network.

Instead of an optical color camera, such as a commercially available digital camera, for example, other cameras which provide high-resolution two-dimensional representation may also be employed.

In addition, other three-dimensional cameras which necessitated only a low resolution may also be employed instead of TOF cameras. Particularly advantageous are three-dimensional cameras by means of which, as will be explained in FIG. 2a, continuous detection of plants may be achieved without having any defined ambient conditions and without stopping and restarting a movement.

Figure 2A:
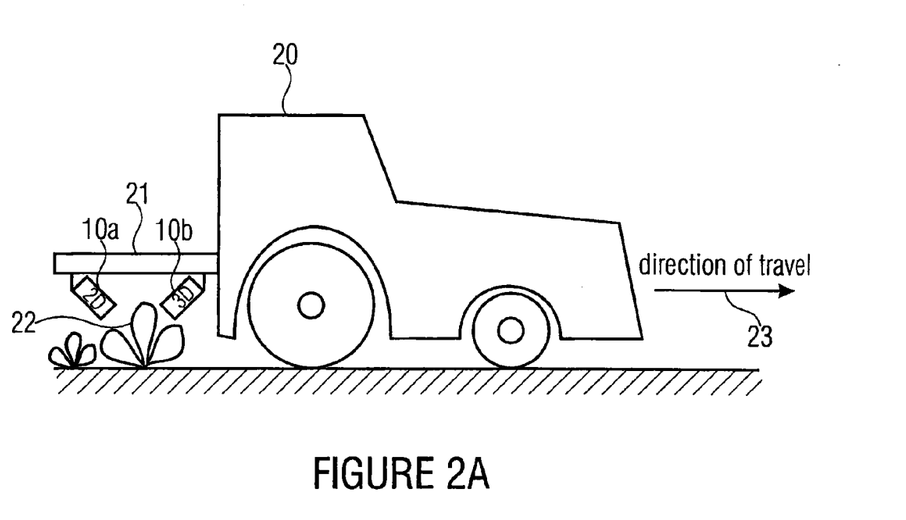
FIG. 2a is an implementation of the inventive device with a vehicle such as a tractor, for example.

FIG. 2a shows an implementation of the device for detecting a plant, which in addition to the two cameras 10a, 10b comprises a vehicle 20, such as a common tractor. The tractor 20 comprises a fastening means 21 having the two cameras 10a, 10b mounted thereon. The cameras are mounted, in particular, such that they are directed in the "line of vision" of a plant 22. It is only for reasons of representation that the cameras "look" at the plant 22 from various perspectives, but this is of no significance for the present invention. The vehicle 20 moves in the direction of travel 23 at a constant speed, the cameras 10a, 10b being configured to detect series of single frames while the vehicle 20 is moving, which series of single frames are then fed into the merging processor (12 of FIG. 1, not shown in FIG. 2a) so as to obtain a 3D result representation of the plant 22.

In an alternative implementation, it is advantageous to perform triggered capturing operations with constant intervals between the pictures captured, or to perform detection as to whether a plant of interest is within the capturing range, so as to then trigger capturing in response to a detection signal if a plant is located within the capturing range of the cameras.

When a series of single frames is detected, it is advantageous to extract, from each single frame of the series of both the two-dimensional representation and the three-dimensional representation, that area which refers to one and the same plant leaf. This area will be located in different places of the photograph from one picture to another, said places depending on the direction of motion of the vehicle 20 (FIG. 2a) if said direction of motion is not superimposed by a motion caused by the wind. This relationship may be used for extracting areas belonging to a leaf from different photographs.

The pieces of information which belong to a leaf and are derived from different photographs are then combined with one another so as to obtain the three-dimensional representation. Thus, with each pair of single frames, one may independently proceed in the same manner, as it were, so as to then combine the resulting three-dimensional representations, such as by averaging several values for the same coordinates or by stitching together results which have been produced from different perspectives and provide information on various areas of a leaf which were not visible in one perspective, but are visible in the other perspective.

Figure 2B:
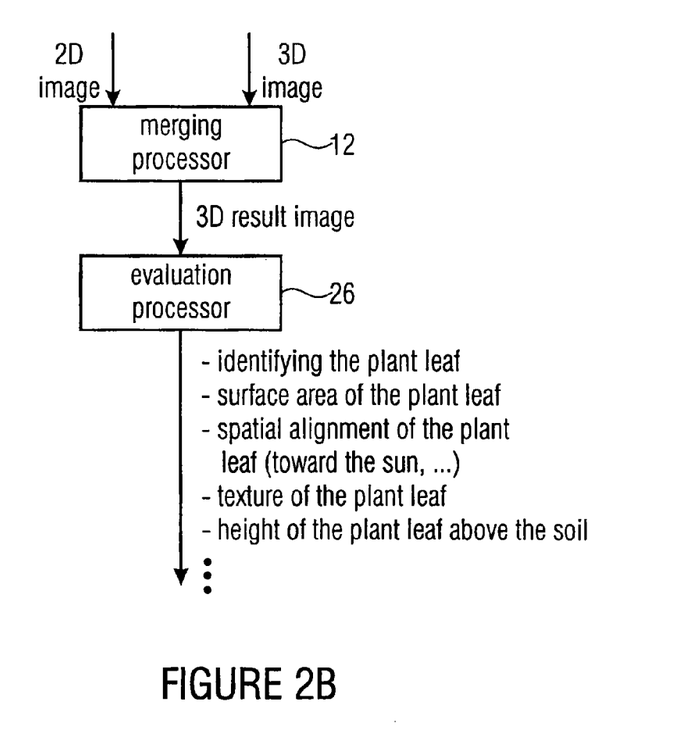
FIG. 2b is a block diagram representation of an inventive device having a down-stream evaluation processor for evaluating the three-dimensional result image created by the merging processor.

FIG. 2b shows an implementation of the present invention, wherein the two-dimensional result representation provided by the merging processor 12 is fed into an evaluation processor 26 so as to perform various evaluations, depending on the case of application.

An evaluation may consist in identifying a plant leaf as belonging to a specific plant. For example, this serves to bring about a differentiation between the useful plant to be examined, such as a sugar beet plant, and weeds which also grow on the field, so as to subsequently, after identifying one plant as being weed, perform automatic weeding, a weeding device also being attached to the vehicle 20, for example in the form of an automatic gripping device. Identification of the plant leaf is effected by means of comparing the three-dimensional result representation and a database comprising various shapes of leaves, a determination being made as to whether or not the leaf shape, stored in the database, for which the best match with the leaf shape in the three-dimensional result image has been found is a weed.

An alternative evaluation obtained by means of the evaluation processor 26 consists in calculating the surface area of the plant leaf. To this end, the area content of the three-dimensional leaf surface area is calculated from the three-dimensional result representation, which is a three-dimensional result image, for example. This may be effected, e.g., by integrating the defined, or bordered, area. The area of a plant leaf indicates how well the plant has grown. Thus, the quality of a seedling may be inferred. In addition, by measuring the size at specific time intervals, the progress of growth of the individual plants may also be determined.

A further manner in which the evaluation processor 26 may perform the evaluation consists in determining the spatial alignment of the plant leaf. In this manner, it is possible to find out whether the leaf is aligned toward the sun or whether the leaf is rather withered and is not aligned in any specific way. In the latter case, this would indicate inadequate ambient conditions for the plants, or inadequate seeds, whereas in the case of a dedicated spatial alignment, as one would expect of a healthy plant of the plant species in question, one may infer favorable ambient conditions and good seeds. The spatial alignment of the plant leaf may be determined using various criteria. On criterion consists in determining a normal vector to a leaf, or to a portion of the leaf, or even for each element (pixel or voxel), or in determining a normal vector, e.g., for all of the leaf portions in each case, so as to then determine, by averaging over said normal vectors pointing in different directions, a resulting normal vector whose direction is the leaf alignment.

Alternatively, one may also search for an alignment of specific distinctive structures, such as a central leaf vein or a leaf apex such so as to specify the leaf alignment depending on how such a specific element of the leaf is aligned in space and/or toward the sun at a specific point in time.

Generally it is advantageous to extract, by means of the processor 12, information about an inner structure of the plant leaf from the two-dimensional image, a three-dimensional result representation also being provided which contains the inner structure of the plant leaf.

A further evaluation that may be achieved by means of the evaluation processor 26 consists in determining the texture of the plant leaf. To this end, structures within the plant leaf—which may be seen in the two-dimensional representation since the two-dimensional representation has a high resolution—are detected and taken into account or even inserted in the three-dimensional reconstruction so as to obtain a three-dimensional representation including texture. A determination of the texture of a plant or plant leaf also provides an indication of the type of leaf, of the state of health of the leaf, and, therefore, also of the qualitative condition of the underlying seeds.

In addition, the evaluation processor 26 is also able to perform an evaluation so as to determine, for example, the height of a plant leaf above the soil of a field. In this manner, it is not only growth of a leaf per se, but also the height of a plant that may be determined as a further criterion for a qualitative condition of a type of seed. The height of a plant leaf, in turn, may be determined by means of various criteria, such as the height of the leaf apex above the soil of the field, or the height of the leaf stalk or node above the soil, etc.

In embodiments, what is measured in plants are the leaf surface area and the spatial alignment of the leaves. Said features may be detected directly on the field in almost any extraneous light conditions and even in unfavorable wind conditions. In the cultivation of plants, the leaf surface area and the constellation of the leaves are important for so-called phenotyping. As accurate a 3D image of plants as possible is created so as to be able to unambiguously allocate it to a plant species by comparing it with a database. This identification of plants is necessitated, for example, for automatic weeding on the field.

Manufacturers of seeds have so far tested the quality of the respective type of seeds by sowing said type of seeds on trial fields and by subjectively evaluating the coming-up of the plants or their growth on the part of a human expert. However, it is desirable to objectively ascertain the leaf surface area and the orientation of the leaves, and to thereby obtain more accurate indications of the quality of the seeds. Describing the shape of the plant is part of so-called phenotyping of plants. The plant shape is determined not only in specific measuring chambers, but directly on the trial field, even if the leaves are intensely moved, e.g. by wind.

For phenotyping plants, the leaf surface area and the spatial alignment of the leaves are to be determined. Using a conventional high-resolution optical (2D) camera, the leaf surface area within the projection plane may be detected with very high precision, but to determine the actual leaf surface area, the spatial orientation of the leaves is also necessitated. This spatial orientation is detected using a TOF camera. Even though the distance of the leaf from the camera with regard to a pixel is determined very inaccurately within the millimeter or even centimeter range, a compensation area may be fitted into the 3D data points by using averaging operations and/or smoothing operations, as a result of which, overall, the spatial orientation of the leaf may be determined with a relatively high level of accuracy. Currently, typical TOF cameras still have relatively few pixels (e.g. 160×120 pixels). The edge contour of the leaves therefore is to be detected using the high-resolution camera. The local angle between the compensation area and the projection plane is calculated for each pixel. Thus, the actual leaf surface area may be calculated from the area determined by means of the conventional high-resolution camera.

Typically, leaves are no flat surfaces, but are curved in various directions. Therefore, plant models are employed for specifying the optimum compensation area. Said plant models are to describe typical 3D leaf shapes of the plant species of interest as accurately as possible. The typical leaf shape is fitted into the 3D data determined by means of the TOF camera. All in all, despite the relatively low 3D resolution of the TOF camera, it will be possible, by combining it with a high-resolution (2D) camera, to determine the leaf surface area with an accuracy to within several percent, which is absolutely sufficient for phenotyping. Since both the 2D capturing operation using the conventional camera and 3D data acquisition using the TOF camera may be effected within a very short time (e.g. 1 millisecond) in a planar and simultaneous manner, this method, which is largely independent on ambient light, may also be employed in the field, even if relatively strong wind is moving the leaves or if data acquisition is performed from a vehicle, e.g. a tractor.

Figure 3A:
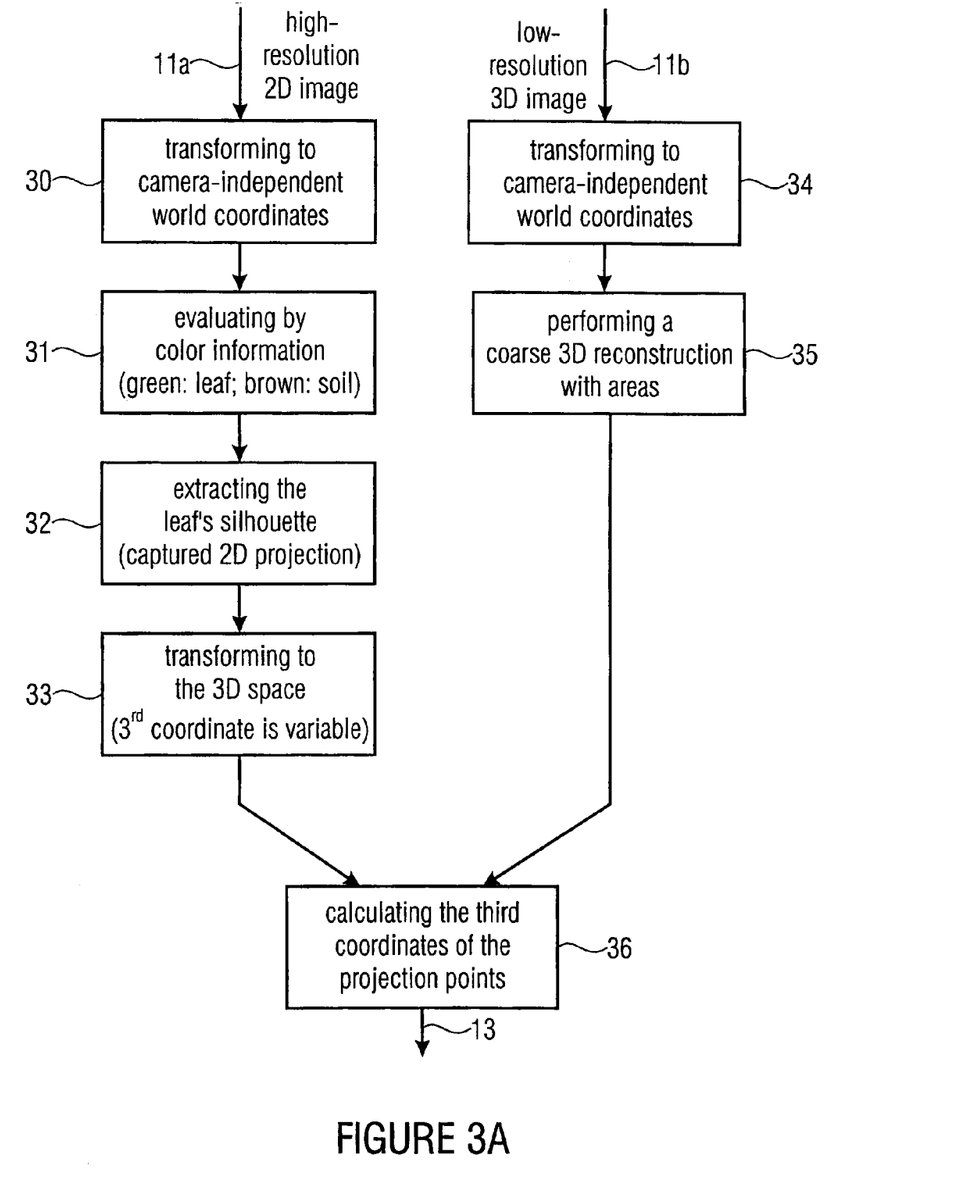
FIG. 3a is a flowchart representation of an implementation of the merging processor and/or of the step of merging the two-dimensional representation and the three-dimensional representation.

FIG. 3a shows an embodiment of an implementation of the merging processor 12 of FIG. 1. The highly resolved two-dimensional image is transformed to a camera-independent world coordinate representation as is depicted in step 30. The transformation specification for transforming the two-dimensional image to the camera-independent world coordinates may be determined by means of calibration, it being possible for said calibration to take place prior to each measuring run or each measuring ride and/or following installation of the camera at the camera carrier 21 of the vehicle 20 of FIG. 2a, and to depend on a position of the camera in the world coordinate system which may be obtained during the measurements. In a step 31, which may take place prior to or following step 30, the two-dimensional image is evaluated in terms of color information, wherein, e.g., green areas are marked as a leaf, which areas will be further examined, whereas brown areas are identified as a field, or are not identified as a leaf Thus, all of the areas which are not of interest may already be eliminated from the two-dimensional representation, specifically—if what is to be identified is leaves—any areas which do not represent leaves. This differentiation is made by means of the color information of a color photograph.

In a step 32, which may also take place prior to or following steps 30 and/or 31, the leaf silhouette of a plant leaf to be determined is determined on the basis of the two-dimensional image. The leaf silhouette is a contiguous, e.g. green, area which represents a two-dimensional projection that has been generated by the two-dimensional photo camera. In step 32, if said step is performed prior to step 31, both the field and possibly other leaves are eliminated from the image, if, e.g., only one single or several independent leaf silhouettes are determined. Elimination of other leaves than the leaf of interest is also performed, in other embodiments, by using three-dimensional information so as to distinguish between two leaves at different heights, which are superimposed in the two-dimensional projection.

In a step 33, a transformation to a three-dimensional space is performed, the third coordinate being variable due to the fact that the two-dimensional image is a two-dimensional photograph. Due to the lack of information on depth, the 3D position of a pixel cannot be unambiguously ascertained. Rather, any number of positions along the beam is possible from the optical center of the camera.

The potential third coordinates for each point of the two-dimensional image may thus be represented as being located on a straight line defined by an object position in world coordinates and by a point of the silhouette. The distance of the silhouette from the optical center, which distance is to be used for defining the straight line, is determined by means of calibration. Said distance is specified for each camera and depends on the focal length set or, if it exists, on the zoom setting of the camera's lens.

Thus, if step 33, which may be performed in any order with regard to steps 30-32, is performed prior to step 32, said straight line is determined for each point of the two-dimensional image, or, if step 33 is performed following the extracting step, as is depicted in FIG. 3a, said straight line is determined only for the points of the leaf silhouette. For the transformation in step 33, the three-dimensional position of the 2D camera during capturing is necessitated, it being possible to determine said position either by calculating it, or to determine it by means of a position sensor in the camera during measurement in addition to the image detection.

The low-resolution three-dimensional image present on a line 11b is transformed, in a step 34, to a camera-independent world coordinate representation when the camera position is known, said world coordinate representation being three-dimensional, but with a low resolution only. Subsequently, a step 35 comprises performing a three-dimensional coarse reconstruction of the plant leaf, areas being created from the three-dimensional image. Said areas represent coarse approximations to a plant surface area and may be created using various area retrieval algorithms, for example using a tessellation into polygon surfaces, or using a surface decision on the basis of pieces of information which, across pixels, are equal to or more similar to one another than a decision threshold, such as color information in the three-dimensional representation, if such color information is available. Alternative area retrieval algorithms may also operate on the basis of intensity information, which differs from pixel to pixel, an area being determined in that the intensity information differs, between adjacent pixels, by less than, e.g., a fixed or variable threshold.

In a step 36, the variable third coordinates obtained in step 33 are subsequently calculated by using the areas determined in the coarse reconstruction 35, so as to obtain the three-dimensional image representation on the line 13.

Figure 3B:
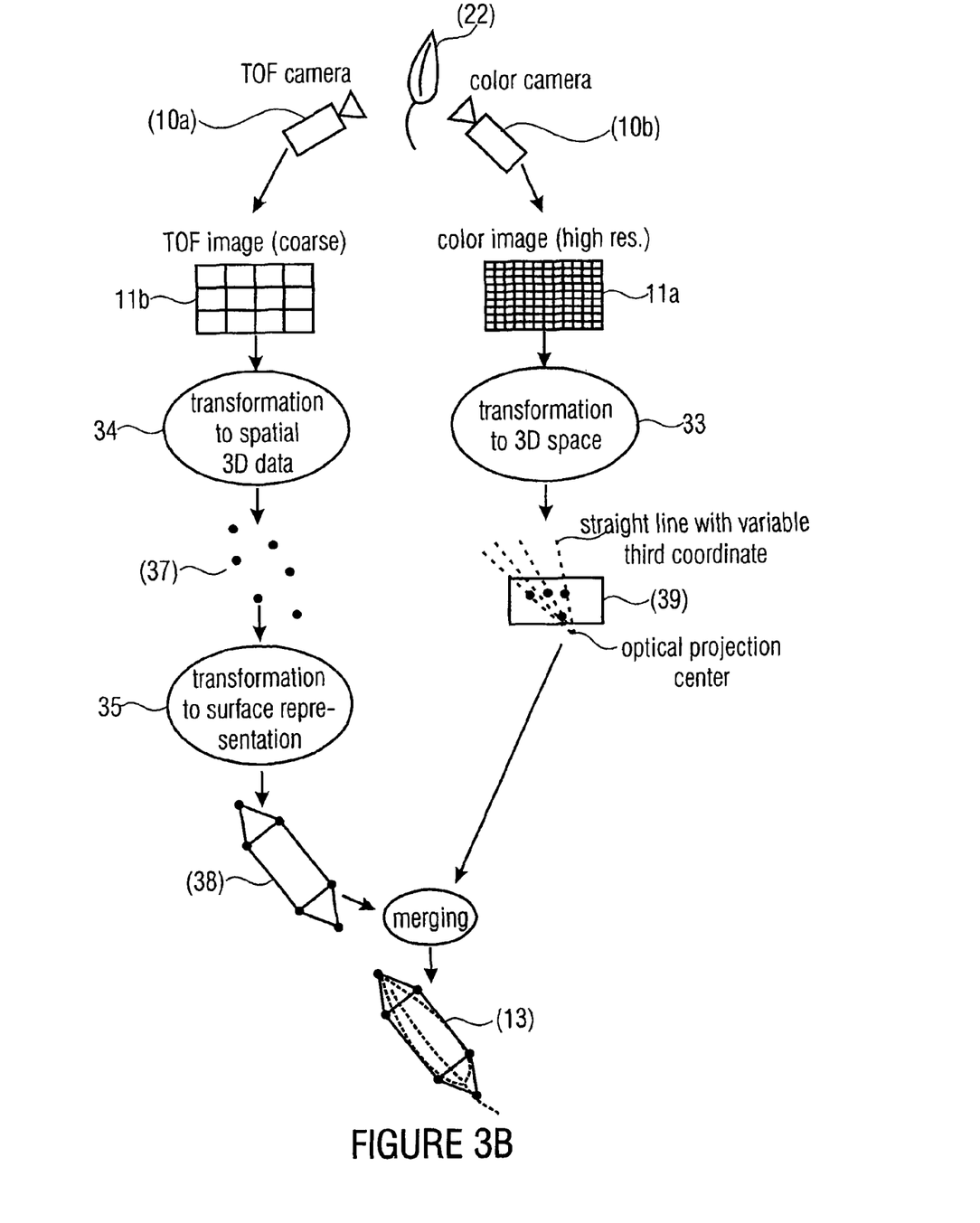
FIG. 3b is an explanatory representation on the functionality of the merging processor and/or of the step of merging in accordance with a further embodiment.

As a further embodiment, FIG. 3b shows an illustration of a system comprising at least one time of flight (TOF) measuring unit 10a and at least one high-resolution conventional camera 10b. Both units look at a plant 22 from any positions desired. A high-resolution color camera is employed as the conventional camera. This enables differentiation between (green) leaves and (brown) soil of the field. In this manner, the leaf surface area may be accurately determined even if the leaves touch the ground.

Initially, the image data of the TOF measuring unit is transformed to spatial coordinates 37. Since the TOF sensor may measure the distance from object points, it is possible to unambiguously convert pixels to 3D world coordinates. The calculation specification is known from a previously performed calibration of the camera.

The 3D point cloud obtained is subsequently transformed to a surface representation 38. Depending on the application, various methods are feasible for this purpose:

A tessellation (decomposition) of the surface into several local surface pieces is possible in that, e.g., adjacent 3D points are combined to form polygon surfaces.

If any foreknowledge about the geometry of the object detected exists, said geometry may be parameterized as a free-form area (as a simple example, a plane may be used), and the parameters may be adapted to the given measurement points. Finding the optimum parameters may be solved, for example, following definition of a measure of a distance of the free-form area from a measurement point using an optimization algorithm.

In addition, it is possible to compare complex geometric models with the measurement points. For example, there is a general morphological model for plant leaves which has been developed by the applicant and whose optimum parameterization may be automatically calculated for a given amount of 3D points.

When determining the areas at 38 in FIG. 3b and in step 35 in FIG. 3a, care has to be taken to ensure that the points of the three-dimensional representation be only coarsely resolved, and generally one cannot assume that a point is located on the very border of the area. Therefore, an area obtained by interpolating between 3D points will (almost) all the time be smaller than or, by chance, at the most equal to the actual area within the 3D space. The area determined by interpolating 3D points is therefore enlarged in an embodiment, so that the actually sought-for area is "contained" within the enlarged area. This enlargement is effected, e.g., by extrapolating the area which has already been determined by, e.g., an empirical measure, such as 10% to 50% or more. The area which will then be obtained will be so large that it will be intersected by each beam between the optical center and the silhouette, as are drawn in at 39 in FIG. 3b. The intersection point of the beam with the extrapolated plane then indicates a border point of the sought-for area. As a result, one may state that the extrapolated areas shown at 38 in FIG. 3b are cut into shape, as it were, namely by means of the two-dimensional information. In this sense, FIG. 3b represents an implementation of the invention wherein the two-dimensional representation/contour is extrapolated, and the extrapolated representation is improved using the 3D information, whereas the implementation of FIGS. 5a to 5d takes the opposite path and converts an interpolated 3D representation to the 2D space and puts it into the right form there using the 2D data.

Thus, a border point is obtained for each point of the silhouette in the two-dimensional representation, so that a three-dimensional border results which is the three-dimensional result representation which at least comprises the border. For each point of the two-dimensional contour, this border comprises three-dimensional information (intersection point of the beam with the straight line), the number of these border points being higher than the number of points of the three-dimensional photograph which define a border of the area which, accordingly, is more coarse (and usually too small). Thus, the three-dimensional result representation includes, e.g., only the border of a leaf or another part of a plant, the border and the area, only the area or only part of a leaf or any other plant portion. However, the three-dimensional representation, which has been obtained by using the two-dimensional data, will have a higher three-dimensional resolution of the border, area, etc., than the corresponding portion (border, area, etc.) of the three-dimensional photograph.

Both the lateral resolution and the depth resolution of the TOF camera are comparatively coarse. Therefore, the reconstructed 3D points are relatively imprecise, on the one hand, and the reconstructed area has a poor resolution, on the other hand. For example, the edge contours have only been coarsely detected, and in the event that the surface is triangulated, said surface is very coarse-mashed. The coarse reconstruction may be refined, however, by merging it with the data of the (color) camera (13), since conventional cameras exhibit a comparatively higher resolution.

For performing the merging, it is also necessitated to transform the pixels of the color camera to world coordinates. This conversion specification is known from a previous calibration of the color camera. Unlike the TOF camera, the color camera does not detect any depth values, however. As a result, a pixel cannot be unambiguously transformed to the 3D space using one perspective. Instead, several projection points are possible which are located on a beam starting from the optical projection center (39). An unambiguous 3D position may be determined, however, from the intersection point of said straight line with the reconstructed surface of the TOF camera.

In this manner it is possible, for example, to extract the object silhouette with very high precision from the highly resolved (color) image, and to project them onto the reconstructed geometry. In this manner, the edge contour of the reconstructed geometry may be determined and cut into shape more accurately. By viewing the object from several different positions, such cutting into shape of the object contour is possible all around. Since not only the edge contour, but also edges within the plant (for example resulting from the plant geometry or the surface texturing of the leaves) may be extracted from the (color) camera images, such a refinement of the reconstructed surface is possible not only along the silhouette, but also within the area.

The reconstruction thus refined enables precise determination of the leaf surface area and the leaf position (spatial alignment of the leaves). Moreover, it is possible to use geometric features obtained from the reconstruction as well as color features for classification applications, or to compare them with a model database, for example in order to determine the state of health of the plant.

An alternative implementation of the merging processor 12 of FIG. 1 will be represented below with reference to FIG. 4, wherein foreknowledge about the plant leaf to be determined is employed so as to determine the three-dimensional area.

Generally, previous knowledge about the image to be detected can be used at any point of obtaining and merging the two-dimension data.

First, the previous knowledge about a shape to be detected, such as a plant leaf can be used as a parameterized model of the shape. If an incomplete image of a leaf is captured by a two-dimensional camera, since, e.g., part of a leaf is hidden, then the missing part of the leaf can be reconstructed by using the previous knowledge. This can be accomplished, for example, with a parameterized three-dimensional model, wherein one parameter can be the orientation and a further parameter the size of the leaf. Alternatively or additionally, further parameters such as length, width, etc. can be used. The two-dimensional image of the leaf represents a projection of a three-dimensional leaf and this projection is completed by using the model. Therefore, by using the incomplete image, the parameters are estimated and the missing section(s) of the two-dimensional image are completed with the estimated parameters. Then, merging with the three-dimensional image as described above can take place, but now with a complete two-dimensional image.

Alternatively or additionally, the previous knowledge can also be used for improving the interpolation of three-dimensional points for obtaining the initial data for extrapolation, which is then cut by a two-dimensional representation. Therefore, by using the three-dimensional points on the sought-for area, a three-dimensional parametric model is fed, which then calculates the parameters, such as length, width, size, position or location, etc., for example by the method of least error squares or similar methods. Therefrom, a better interpolation of the three-dimensional points is obtained, since the model improves interpolation with the calculated parameters. Additionally or alternatively, the model can also be used for extrapolation. As illustrated, the interpolated area will almost all the time be to small, but never to large. Hence, the area determined from the three-dimensional points is enlarged. For this extrapolation the model can be used again, wherein the same model is used with the same parameters as were calculated for the interpolation, or wherein, when a different or no model was used for interpolation, specific parameters are calculated for the extrapolation.

The improved area obtained in that manner is then cut by applying the two-dimensional representation which has also been generated by previous knowledge.

Hence, the previous knowledge of a parameterized model can be used for improving the transformation of the three-dimensional data into the surface representation (e.g. step 35 in FIG. 3a or 3b), or for improving the two-dimensional representation in steps 30, 31, 32 or 33) or for improving both measures, wherein in the latter case, the same model and the same parameters are used, but different models and/or different parameters can be used as well.

The two-dimensional image 11a is subject to an extraction algorithm in a step 40 so as to extract a silhouette of a leaf from the two-dimensional image. The extraction algorithm may be the same as the extraction algorithm in step 32 of FIG. 3a and may be based on defining a silhouette as a border of an area which includes pixels having similar colors.

In a step 41, the extracted silhouette is used for accessing a database comprising parametric leaf models. In particular, for each leaf model there exist sample silhouettes stored in the database, and for each candidate sample silhouette, a degree of correspondence between said sample silhouette and the extracted silhouette is calculated. This degree of correspondence is examined, in a step 42, for each candidate silhouette so as to then select that leaf model from the database whose sample silhouette best matches the silhouette extracted in step 40. Subsequently, the parameter or—if there are several parameters—the parameters of the parameterized leaf model selected in step 42 is/are calculated in a step 43, the three-dimensional points here being employed as nodes of the numeric, as it were, parameter calculation.

Therefore, the three-dimensional image 11b of the 3D camera is used in step 43. Step 43 provides the parameter values for the leaf model selected in step 42, and the three-dimensional result representation is calculated, in a step 44, using the parameter values and the underlying leaf model. If only one leaf surface area is necessitated, no transformation to world coordinates needs to take place for the algorithm shown in FIG. 4. The transformation to world coordinates, which may also be performed with the result representation, however, i.e. after the three-dimensional data and the two-dimensional data have been merged, is employed when the leaf position is also to be calculated. For other evaluations, e.g. the height of the leaf (distance of the leaf from the ground) etc., it is also advantageous to determine the three-dimensional result representation in camera-independent world coordinates.

Figure 4:
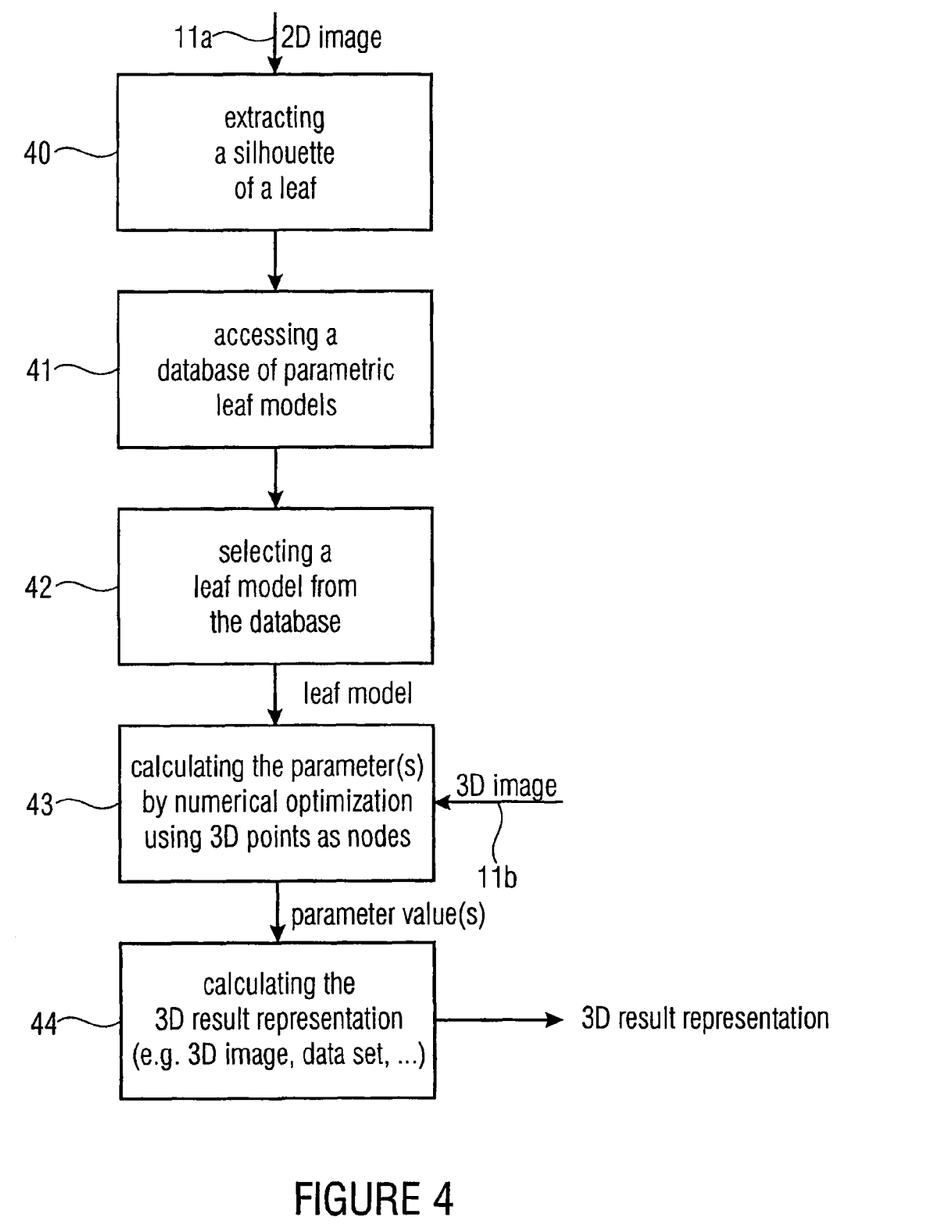
FIG. 4 is an alternative implementation of the merging processor and/or of the merging step.

As was described with the two-dimensional camera in connection with FIGS. 3a and 3b, respectively, the embodiment shown in FIG. 4 comprises either calculating the position of the three-dimensional camera during capturing of the coarsely resolved three-dimensional image in world coordinates, for example using the geometry of the capturing means of the vehicle 20 of FIG. 2a, or comprises determining the three-dimensional coordinate in world coordinates by means of a three-dimensional position sensor based, e.g., on GPS or any other localizing method in three-dimensional space. In the embodiment shown in FIG. 4, only the spatial position of the three-dimensional camera is used, whereas the spatial position of the two-dimensional camera is not necessitated for the implementation shown in FIG. 4.

Figure 5A:
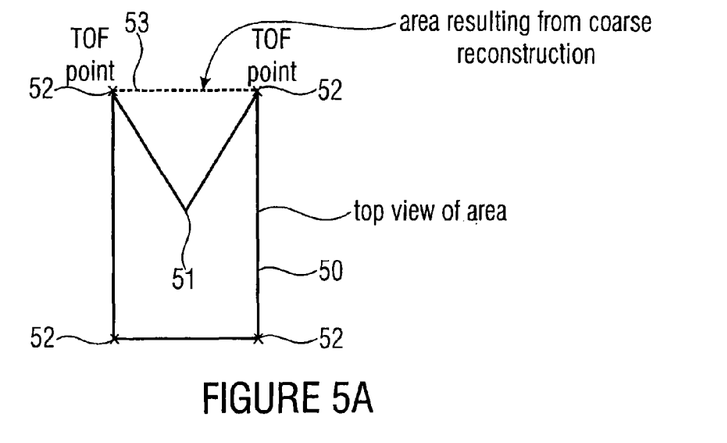
FIGS. 5a-5d are explanatory representations for illustrating an alternative implementation of the merging processor and/or of the merging step.

FIGS. 5a-5d show further implementations of the merging processor. For example, FIG. 5a shows a top view of an area 50 having a notch 51. The top view of the area would be obtained if the area were captured from the top using the two-dimensional camera. The coarsely resolved three-dimensional camera merely creates measurement points at nodes which are spaced apart by a relatively large distance and which are designated by 51, or "TOF point". If a coarse reconstruction of the area were performed wherein adjacent TOF points are connected, a line 53 which completely ignores the notch 51 would be obtained as an area boundary.

Figure 5B:
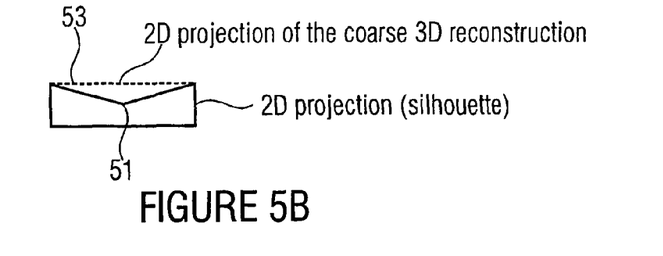

If the area shown in FIG. 5a is depicted in a two-dimensional projection, the notch 51 can still be seen. The two-dimensional projection in FIG. 5b is obtained, for example, by a highly resolving two-dimensional camera. If the area in FIG. 5a were projected from the three-dimensional coarse reconstruction to a two-dimensional projection or silhouette, the boundary line 53, which is depicted as a dashed line and which ignores the corner 51, would be obtained yet again.

Figure 5C:
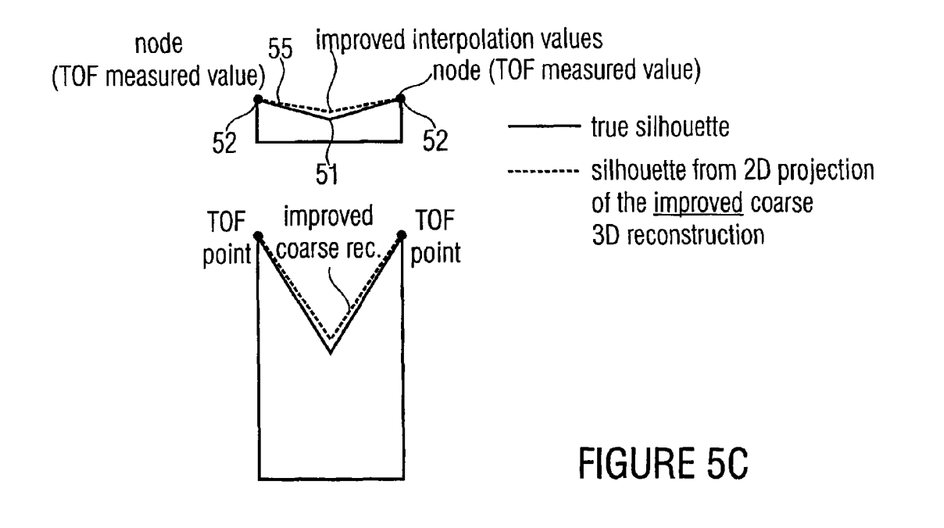

FIG. 5c shows the situation of FIGS. 5a and 5b, respectively, wherein the dashed line 53, which represents a boundary line of an area from the coarse reconstruction, has been improved, however. In particular, the interpolation of the three-dimensional values between the nodes or TOF measurement values 52, for which three-dimensional data has been measured, is improved in that an improved interpolation of values 55 is selected. In this manner, one achieves that the improved interpolation values 55 better correspond to the true silhouette comprising the notch 51. When looking at the top view of the area comprising the improved coarse reconstruction in FIG. 5c, one will find that the three-dimensional interpolation has been improved due to the two-dimensional silhouette, which has been captured with a high resolution.

Figure 5D:
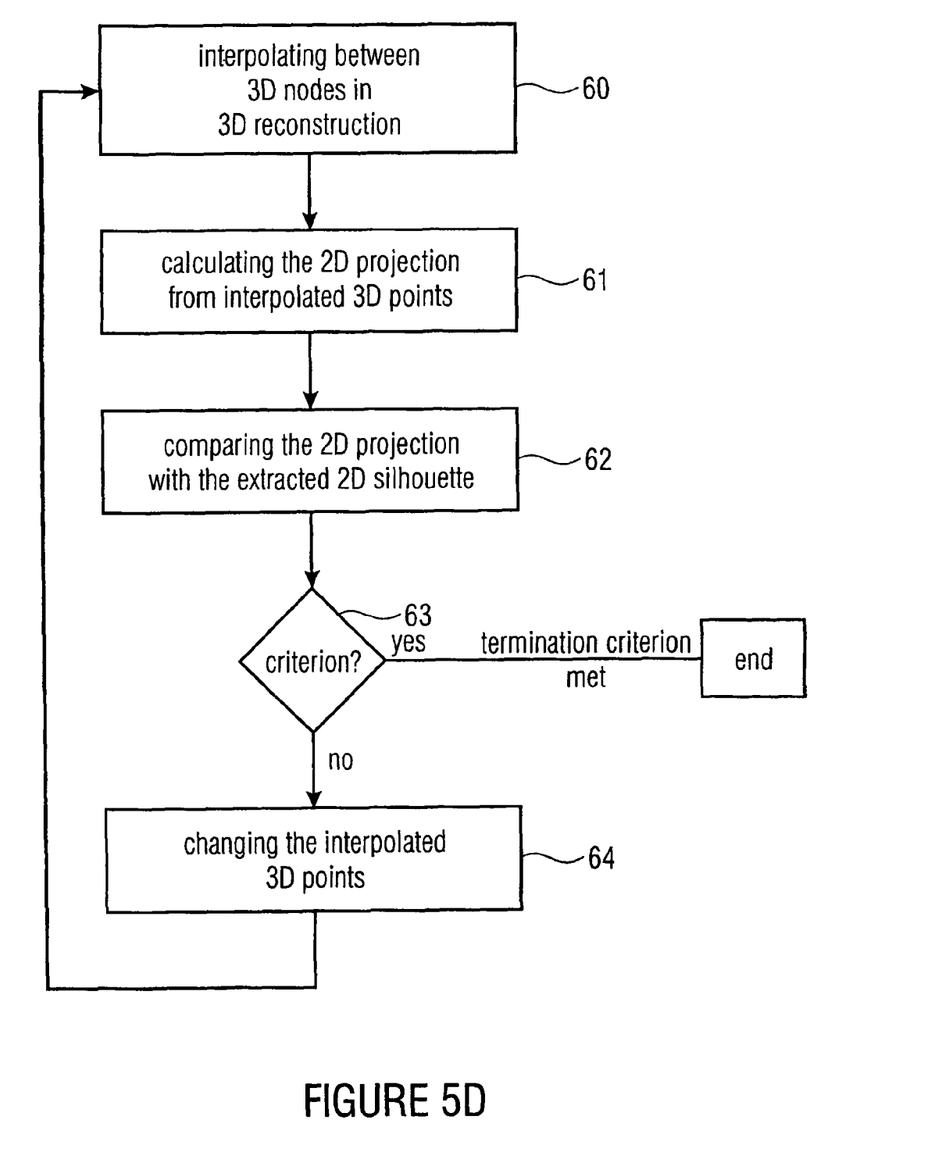

An algorithm which is used for obtaining the improved interpolation values of FIG. 5c will be explained below with reference to FIG. 5d. First of all, a step 60 comprises performing a three-dimensional interpolation between the three-dimensional nodes which have been measured by the 3D camera, so as to obtain a boundary line of an area. The interpolation may be a straight-line connection of adjacent three-dimensional points or any other, more expensive interpolation specification, for example.

Subsequently, a step 61 comprises calculating a two-dimensional projection from the interpolated three-dimensional points, as would correspond to the dashed line 53 in FIG. 5b. In a step 62, the two-dimensional projection is then compared to the extracted two-dimensional silhouette. If it is determined, in a step 63, that a termination criterion is not met, a step 64 will comprise performing a change in the interpolated three-dimensional points, specifically in such a manner that the improved interpolation values better correspond to the true values of the silhouette. Following this, steps 60, 61, 62 and 63 are performed once again until a termination criterion is met which either consists in that a maximum number of iterations have been performed, or which consists in that a deviation between the interpolated points and the true points of the silhouette in step 62 is smaller than a predetermined threshold value.

In an alternative embodiment, a conversion of the two-dimensional silhouette to the three-dimensional space takes place instead of the conversion of the three-dimensional reconstruction to a two-dimensional projection.

This is followed by a comparison in the three-dimensional domain, which in step 62 takes place in the two-dimensional domain.

The inventive concept is also particularly well suited for application in a greenhouse. Unlike systems wherein plants are moved within a greenhouse, e.g. to a measurement station via rails, which causes stress to the plants, it is advantageous that the inventive device be moved to the plant without the plant being moved. This is effected, for example, by means of a rail construction or cable railway construction in a space of the greenhouse which is mounted above the plants or at the ceiling of the greenhouse. Thus, it is possible to make optimum use of the expensive greenhouse space, since no plant positioning space is wasted by rails or the like.

Depending on the circumstances, the inventive method may be implemented in hardware or in software. Implementation may be on a digital storage medium, in particular a disk or CD with electronically readable control signals which may interact with a programmable computer system such that the respective method is performed. Generally, the invention thus also consists in a computer program product with a program code, stored on a machine-readable carrier, for performing the inventive method, when the computer program product runs on a computer. In other words, the invention may thus be realized as a computer program having a program code for performing the method, when the computer program runs on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for detecting a plant, comprising:
a provider for providing at least one two-dimensional image of a plant leaf with a first two-dimensional resolution, and for providing at least one three-dimensional image of the plant leaf, the three-dimensional image comprising a two-dimensional representation of the plant leaf with a second two-dimensional resolution which is smaller than the first two-dimensional resolution, and comprising a third dimension of the three-dimensional image for points of the two-dimensional representation; and
a processor for merging the two-dimensional image and the three-dimensional image so as to acquire a three-dimensional result representation of at least a portion of the plant leaf, said result representation comprising three-dimensional information for a number of points which is larger than the number of points of the portion of the three-dimensional image for which the information about the third dimension exists,
to transform the three-dimensional image to a surface representation,
to transform the two-dimensional image to a multi-valued three-dimensional representation wherein a third dimension is multi-valued and is restricted to comprising points on a beam starting from a projection center, and
to determine an unambiguous third dimension by calculating an intersection point of the beam with the surface representation.

2. The device as claimed in claim 1, wherein the processor is implemented to enlarge, by extrapolation, an area generated from the three-dimensional image during generation of the surface representation, such that a sought-for three-dimensional area is comprised in the area enlarged by extrapolation, and
wherein intersection points of the beams indicate border points of the sought-for three-dimensional area, such that the area enlarged by extrapolation is cut by using the intersection points for acquiring the sought-for three-dimensional area.

3. The device as claimed in claim 1, wherein for generating the areas from the three dimensional image an interpolation of points of the three-dimensional image is performed.

4. The device as claimed in claim 2, wherein the extrapolation is performed such that the area generated from the three-dimensional image is enlarged by a measure between 10% and 50% of the area generated from the three-dimensional image or more.

5. The device as claimed in claim 1, wherein the provider comprises at least one 2D camera for detecting the two-dimensional image which may be implemented as an optical color camera, or
wherein the provider comprises at least one 3D camera for detecting the three-dimensional image, the information about the third dimension of the three-dimensional image comprising distance values between points of the three-dimensional image and the three-dimensional camera, it being possible for the three-dimensional camera to be a TOF camera.

6. The device as claimed in claim 1, further comprising:
a vehicle implemented to travel on a field or in a greenhouse, a 2D camera and a 3D camera being mounted on the vehicle.

7. The device as claimed in claim 1,
wherein a 2D camera and a 3D camera are implemented to detect a series of single frames of the plant leaf in each case, a detection time for a single frame being shorter than 50 ms.

8. The device as claimed in claim 1, wherein the processor is implemented to calculate a three-dimensional coarse reconstruction of the plant leaf using the three-dimensional image, to extract a two-dimensional silhouette of the plant leaf from the two-dimensional image, and
to refine the three-dimensional coarse reconstruction using the two-dimensional silhouette.

9. The device as claimed in claim 8, wherein the processor is implemented to refine the three-dimensional coarse reconstruction such that a two-dimensional silhouette of the refined coarse construction better matches the extracted silhouette than a two-dimensional silhouette of the three-dimensional coarse reconstruction, or
that a three-dimensional reconstruction of the extracted silhouette better matches the refined three-dimensional reconstruction than it matches the three-dimensional coarse reconstruction prior to the refinement.

10. The device as claimed in claim 1,
wherein a 2D camera and a 3D camera are implemented to generate, for the plant leaf, at least two single frames from different capturing directions in each case, and
wherein the processor is implemented to use the at least two single frames of the two cameras for creating the three-dimensional result representation.

11. The device as claimed in any of the previous claims, wherein the processor is implemented to calculate, from the three-dimensional result representation, an area of the plant leaf or a position of the plant leaf within the three-dimensional space.

12. The device as claimed in claim 1, further comprising a calibrator implemented to provide, for a 2D camera and a 3D camera, one calculation specification in each case with which coordinates of the two-dimensional image of the 2D camera and coordinates of the three-dimensional image of the 3D camera may be converted to a uniform world coordinate system,
the processor being implemented to convert the two-dimensional image and the three-dimensional image to two-dimensional world coordinates and three-dimensional world coordinates, respectively.

13. The device as claimed in claim 1,
wherein the processor is implemented to employ fore-knowledge about an expected geometry of the plant leaf during transformation of the three-dimensional image into a surface representation or during generation or transformation of the two-dimensional image into the multi-valued three-dimensional representation.

14. The device as claimed in claim 1, wherein the processor is implemented to extract an outline of the plant leaf from the two-dimensional representation, to extract a parameterized area from a database by using the outline with foreknowledge about an expected geometry of the plant leaf, and to calculate one or several parameters for the parameterized area by using the three-dimensional representation so as to acquire the result representation.

15. The device as claimed in claim 1,
wherein the processor is implemented to extract an outline or a silhouette of the plant leaf from the two-dimensional image by using color information of the two-dimensional image.

16. The device as claimed in claim 1,
wherein the processor is implemented to extract, from the two-dimensional image, information about an inner structure of the plant leaf, and to provide a three-dimensional result representation in which the inner structure of the plant leaf is comprised.

17. The device as claimed in claim 1, wherein the portion of the plant leaf is a border of the plant leaf.

18. A method of detecting a plant, comprising:
providing a two-dimensional image of a plant leaf with a first two-dimensional resolution, and providing a three-dimensional image of the plant leaf, the three-dimensional image comprising a two-dimensional representation of the plant leaf with a second two-dimensional resolution which is smaller than the first two-dimensional resolution, and comprising a third dimension of the three-dimensional image for points of the two-dimensional representation; and merging the two-dimensional image and the three-dimensional image so as to acquire a three-dimensional result representation of at least a portion of the plant leaf, said result representation comprising three-dimensional information for a number of points which is larger than the number of points of the portion of the three-dimensional image for which the information about the third dimension exists, to transform the three-dimensional image to a surface representation, to transform the two-dimensional image to a multi-valued three-dimensional representation wherein a third dimension is multi-valued and is restricted to comprising points on a beam starting from a projection center, and to determine an unambiguous third dimension by calculating an intersection point of the beam with the surface representation.

19. A computer program comprising a program code for performing a method of detecting a plant, the method comprising:

providing a two-dimensional image of a plant leaf with a first two-dimensional resolution, and providing a three-dimensional image of the plant leaf, the three-dimensional image comprising a two-dimensional representation of the plant leaf with a second two-dimensional resolution which is smaller than the first two-dimensional resolution, and comprising a third dimension of the three-dimensional image for points of the two-dimensional representation; and merging the two-dimensional image and the three-dimensional image so as to acquire a three-dimensional result representation of at least a portion of the plant leaf, said result representation comprising three-dimensional information for a number of points which is larger than the number of points of the portion of the three-dimensional image for which the information about the third dimension exists, to transform the three-dimensional image to a surface representation, to transform the two-dimensional image to a multi-valued three-dimensional representation wherein a third dimension is multi-valued and is restricted to comprising points on a beam starting from a projection center, and to determine an unambiguous third dimension by calculating an intersection point of the beam with the surface representation, when the computer program runs on a computer.

\* \* \* \* \*

UNITED STATES PATENT AND TRADEMARK OFFICE
CERTIFICATE OF CORRECTION

PATENT NO. : 8,340,402 B2
APPLICATION NO. : 12/794389
DATED : December 25, 2012
INVENTOR(S) : Schmitt et al.

It is certified that error appears in the above-identified patent and that said Letters Patent is hereby corrected as shown below:

In the Claims

Column 18, Claim 19, Lines 9-11, Replace "A computer program comprising a program code for performing a method of detecting a plant, the method comprising:" with "A computer program comprising a non-transitory computer medium storing a program code for performing a method of detecting a plant, the method comprising:"

Signed and Sealed this
Twenty-fifth Day of June, 2013

Teresa Stanek Rea
*Acting Director of the United States Patent and Trademark Office*